US008084565B2

(12) United States Patent
Suzuki et al.

(10) Patent No.: US 8,084,565 B2
(45) Date of Patent: Dec. 27, 2011

(54) CATALYST FOR POLYMERIZATION OF CONJUGATED DIENE AND METHOD OF POLYMERIZING CONJUGATED DIENE USING THE CATALYST, RUBBER COMPOSITION FOR TIRES, AND RUBBER COMPOSITION FOR GOLF BALLS

(75) Inventors: Michinori Suzuki, Chiba (JP); Masato Murakami, Chiba (JP); Naomi Okamoto, Chiba (JP); Mitsuharu Eikyuu, Chiba (JP); Kouji Ishiguchi, Chiba (JP)

(73) Assignee: Ube Industries, Ltd. (JP)

( * ) Notice: Subject to any disclaimer, the term of this patent is extended or adjusted under 35 U.S.C. 154(b) by 143 days.

(21) Appl. No.: 12/685,391

(22) Filed: Jan. 11, 2010

(65) Prior Publication Data
US 2010/0113676 A1    May 6, 2010

Related U.S. Application Data

(62) Division of application No. 10/595,414, filed as application No. PCT/JP2005/019302 on Oct. 20, 2005.

(30) Foreign Application Priority Data

| Nov. 1, 2004 | (JP) | ................................. 2004-318598 |
| Nov. 1, 2004 | (JP) | ................................. 2004-318599 |
| Mar. 2, 2005 | (JP) | ................................. 2005-057078 |
| Mar. 8, 2005 | (JP) | ................................. 2005-063396 |
| Mar. 8, 2005 | (JP) | ................................. 2005-063397 |
| Jun. 9, 2005 | (JP) | ................................. 2005-169233 |
| Jun. 15, 2005 | (JP) | ................................. 2005-174507 |
| Aug. 5, 2005 | (JP) | ................................. 2005-227760 |

(51) Int. Cl.
*C08L 9/00* (2006.01)
*C08F 4/52* (2006.01)
*C08F 136/06* (2006.01)
*B01J 31/20* (2006.01)
*B01J 31/22* (2006.01)

(52) U.S. Cl. ...................... 526/340.4; 526/133; 526/134; 526/164; 502/102; 502/171; 502/202; 525/232; 525/236

(58) Field of Classification Search .................. 502/102, 502/171, 202; 526/133, 134, 164, 340.4; 525/232, 236
See application file for complete search history.

(56) References Cited

U.S. PATENT DOCUMENTS

| 4,929,678 | A | 5/1990 | Hamada et al. |
| 6,284,697 | B1 * | 9/2001 | Windisch et al. .............. 502/102 |
| 6,670,416 | B1 | 12/2003 | Blok |
| 2003/0013556 | A1 | 1/2003 | Burkhart et al. |
| 2003/0018144 | A1 | 1/2003 | Kaita et al. |

FOREIGN PATENT DOCUMENTS

| CN | 1424333 A | 6/2003 |
| EP | 0 856 530 A2 | 8/1998 |
| EP | 1 221 385 A2 | 10/2002 |
| EP | 1 840 130 A1 | 3/2007 |
| GB | 1 294 725 | 11/1972 |
| JP | 62-089750 | 4/1987 |
| JP | 02-177973 | 7/1990 |
| JP | 06-228221 | 8/1994 |
| JP | 07-070143 | 3/1995 |
| JP | 07-118443 | 5/1995 |
| JP | 07-268013 | 10/1995 |
| JP | 07-268132 | 10/1995 |
| JP | 08-325330 | 12/1996 |
| JP | 09-020811 | 1/1997 |
| JP | 09-151219 | 6/1997 |
| JP | 10-060174 | 3/1998 |
| JP | 10-324707 | 12/1998 |
| JP | 11-217465 | 12/1998 |
| JP | 11-080222 | 3/1999 |
| JP | 11-181012 | 7/1999 |
| JP | 11-222536 | 8/1999 |
| JP | 2000-313710 | 11/2000 |
| JP | 2001-040040 | 2/2001 |
| JP | 2001-064313 | 3/2001 |
| JP | 2001-247721 | 9/2001 |
| JP | 2003-226721 | 8/2003 |
| WO | 02/059157 A2 | 8/2002 |

OTHER PUBLICATIONS

Arndt, Stefan; "Homogeneous Ethylene-Polymerization Catalysts Based on Alkyl Cations of the Rare-Earth Metals: Are Dicationic Mono(alkyl) Complexes the Active Species?"; Angewandte Chemie, International Edition, vol. 42, pp. 5075-5079, 2003.

Kaita, Shojiro et al.; "Stereospecific Polymerization of 1,3-Butadiene with Samarocene-Based Catalysts"; Macromolecules 1999, v. 32, p. 9078-9079.

Zhang, Lixin et al.; "Generation and olefin polymerization catalysis of novel cationic rare earth metal alkyl complexes bearing linked cyclopentadienyl-phosphido ligands"; Nippon Kagakkai Koen Yokoshu, v. 84, p. 243, 2004.

(Continued)

*Primary Examiner* — Caixia Lu
(74) *Attorney, Agent, or Firm* — Clark Hill PLC

(57) ABSTRACT

A catalyst for polymerization of conjugated diene is provided, which facilitates manufacture of a conjugated diene polymer with a high 1,4-cis structure content, leaves less aluminum residue on polymerization, and has high activity. A method of manufacturing conjugated diene polymers using the catalyst is also provided. A catalyst for polymerization of conjugated diene comprises (A) an yttrium compound; (B) an ionic compound including a non-coordinate anion and a cation; and (C) an organometallic compound including an element selected from the groups 2, 12 and 13 of the periodic table.

4 Claims, No Drawings

OTHER PUBLICATIONS

Li, Junfei, "Gas Phase Polymerization of Diene—Research on Polymerization Kinetics and Molecular Weight Control", Jan. 25, 2002.
Supplementary European Search Report which issued in connection with corresponding European Application No. 05795844.9 on Sep. 10, 2009.

Examination Report which issued in connection with corresponding European Application No. 05795844.9 on Dec. 28, 2009.
Pires, Neusa M. T., et al.; "Performance Evaluation of High-cis, 1,4-Polybutadienes"; Journal of Applied Polymer Science; vol. 99, p. 88-99; 2006; US.

* cited by examiner

CATALYST FOR POLYMERIZATION OF CONJUGATED DIENE AND METHOD OF POLYMERIZING CONJUGATED DIENE USING THE CATALYST, RUBBER COMPOSITION FOR TIRES, AND RUBBER COMPOSITION FOR GOLF BALLS

RELATED APPLICATION

Priority Claim

This application is a divisional of U.S. patent application Ser. No. 10/595,414, filed on Jan. 8, 2008. U.S. patent application Ser. No. 10/595,414 is a National Phase filing regarding International Application No. PCT/JP2005/019302 filed on Oct. 20, 2005, which claims priority from Japanese Patent Application No. 2004-318598 filed on Nov. 1, 2004, Japanese Patent Application No. 2004-318599 filed on Nov. 1, 2004, Japanese Patent Application No. 2005-057078 filed on Mar. 2, 2005, Japanese Patent Application No. 2005-063396 filed on Mar. 8, 2005, Japanese Patent Application No. 2005-063397 filed on Mar. 8, 2005, Japanese Patent Application No. 2005-169233 filed on Jun. 9, 2005, Japanese Patent Application No. 2005-174507 filed on Jun. 15, 2005, and Japanese Patent Application No. 2005-227760 filed on Aug. 5, 2005.

FIELD OF THE INVENTION

The present invention relates to a catalyst for polymerization of conjugated diene with a high 1,4-cis structure content, and method of manufacturing conjugated diene polymers using the catalyst. It also relates to a rubber composition for tires having excellent abrasion resistance and flex crack-growth endurance and improved heat radiation, and a rubber composition for golf balls having appropriate hardness together with high rebound and excellent processability.

BACKGROUND OF THE INVENTION

Catalysts for polymerization of conjugated dienes such as a 1,3-butadiene and an isoprene have been conventionally proposed a lot and some of them have been industrialized. For example, a method of manufacturing conjugated diene polymers with a high cis-1,4 structure often uses a compound of titanium, cobalt, nickel or neodymium and an organoaluminum in combination.

The use of a group-3 element of the periodic table as a catalyst for polymerization of conjugated dienes has been well known, and various polymerization methods have been proposed until now. For example, JP-A 6-228221 discloses a solid catalyst holding a support for (co)polymerization of conjugated dienes, which holds a compound of at least one of metals having atomic numbers 57-71, 92 on a support. An yttrium catalyst having an atomic number 39 is hardly described however.

JP-A 1-10143 discloses an organometallic complex including yttrium (Y), neodymium (Nd) or praseodymium (Pr) and a group-13 element. No example of polymerization of yttrium complexes is described however.

JP-A 7-268013 describes a catalytic system including neodymium (Nd), praseodymium (Pr), dysprosium (Dy), lanthanum (La), gadolinium (Ga) and yttrium (Y) in combination with an aluminum alkyl and a trialkyl derivative of boron. It exemplifies methods of polymerizing conjugated diene compounds, which are though limited in neodymium and praseodymium.

JP-A 8-325330, JP-A 9-151219, JP-A 10-60174, JP-A 11-217465 and JP-A 11-222536 exemplify yttrium as a metal to be turned into a catalyst for manufacture of a cis-1,4-polybutadiene but fail to provide any specified example using an yttrium catalyst.

JP-A 2003-226721 discloses a method of manufacturing a cis-1,4-polybutadiene in the presence of a catalyst, which is a compound of an element selected from the group consisting of scandium, yttrium, lanthanides and actinides. No specified example using an yttrium catalyst is shown, however, and exemplification of the method of polymerizing conjugated diene compounds is limited in neodymium and praseodymium.

A Polybutadiene has a bonded portion (1,4-structure) generated from polymerization at the 1,4-site and a bonded portion (1,2-structure) generated from polymerization at the 1,2-site, which coexist in a molecular chain as the so-called microstructure. The 1,4-structure further classified into two: a cis structure and a trans structure. On the other hand, the 1,2-structure is structured to have a vinyl group in a side chain.

As known, depending on polymerization catalysts and polymerization conditions, polybutadienes different in the above microstructure are produced and employed in various uses in accordance with their properties.

For the purpose of improving the heat radiation and abrasion resistance of tires, blending a polybutadiene rubber (BR) in natural rubber and so forth is widely performed, and various BRs are proposed. For, example, JP-A 7-118443 discloses a BR having a weight average molecular weight of 500,000-750,000, a molecular weight distribution of 1.5-3.0, and an inherent viscosity of 90 or more. JP-A 2001-247721 discloses a BR having a cis content of 95% or more and a molecular weight distribution of 3.5-6.0.

In a rubber composition for golf balls, particularly, a high-cis polybutadiene with a relatively narrow molecular weight distribution and a high molecular linearity has a property excellent in abrasion resistance, resistance to heat radiation, and rebound resilience. As an index of linearity of high-cis polybutadienes with almost similar molecular weight distributions, $Tcp/ML_{1+4}$ is used. Tcp indicates the degree of molecular entanglement in a thick solution. The lager the $Tcp/ML_{1+4}$, the smaller the branch degree and the larger the linearity is.

Golf balls are classified into a thread wound type and a solid type. The solid center in the thread wound ball, as well as the solid ball, conventionally includes a rubber base material such as a polybutadiene, and a monomer having an unsaturated bond, such as an unsaturated metal carboxylate, compounded therein as a crosslinking coagent. A peroxide and a metal oxide are also compounded therein.

The polybutadiene used as the rubber base material of golf balls is generally required to have high rebound and excellent processability. A higher. Mooney viscosity improves the rebound but worsens the processability while a wider molecular weight distribution improves the processability but lowers the rebound in an antinomy relation.

For the purpose of achieving the compatibility of processability and rebound, improvements in polybutadiene rubber have been tried and various proposals have been provided. For example, JP-A 63-275356 and JP-A 2-177973 disclose polybutadienes having a high Mooney viscosity and a wide molecular weight distribution and synthesized in the presence of a Ni-based catalyst. JP-A 6-00123 discloses a method that uses a polybutadiene having a low Mooney viscosity blended with a polybutadiene having a high Mooney viscosity.

JP-A 7-268132 discloses the use of a polybutadiene, having a cis content of 97% or more and modified with a tin compound, as a rubber base material for golf balls. This remains unchanged in the closslink density, however, compared to the conventional high-cis polybutadiene, and accordingly an improvement is desired in durability.

The Inventor et al. disclose in JP-A 2001-40040 that a polybutadiene appropriately having the 1,2-content can be used in long-carry golf balls.

SUMMARY OF THE INVENTION

Subject to be Solved by the Invention

The conventional titanium-, cobalt- and nickel-based catalysts for polymerization of conjugated diene have a problem because the 1,4-cis structure content is low. A neodymium catalyst system containing no methyl alumoxane promoter has low activity on polymerization while a neodymium catalyst system containing a methyl alumoxane promoter leaves an aluminum residue a lot after polymerization disadvantageously.

In the rubber composition for tires, generally BR is excellent in heat radiation, abrasion resistance and rebound resilience but poor in chip-cut property and flex crack-growth endurance. In this case, a widened molecular weight distribution or branching may improve the flex crack-growth endurance but lower the heat radiation and abrasion resistance disadvantageously.

In the rubber composition for golf balls, those having higher rebound than usual and excellent in processability are eagerly desired.

The present invention has a first object to provide a catalyst for polymerization of conjugated diene polymers, which facilitates manufacture of a conjugated diene polymer with a high 1,4-cis structure content, leaves less aluminum residue on polymerization, and has high activity. A method of manufacturing conjugated diene polymers using the catalyst is also provided.

The present invention has a second object to provide a rubber composition for tires, having excellent abrasion resistance and flex crack-growth endurance and improved heat radiation.

The present invention has a third object to provide a rubber composition for golf balls, having maintained hardness and high rebound together with excellent processability.

Means for Solving the Subject

To achieve the first object, the present invention provides a catalyst for polymerization of conjugated diene, comprising: (A) an yttrium compound; (B) an ionic compound including a non-coordinate anion and a cation; and (C) an organometallic compound including an element selected from the groups 2, 12 and 13 of the periodic table.

The catalyst for polymerization of conjugated diene according to the present invention comprises the yttrium compound. Accordingly, it has a higher 1,4-cis structure content compared to the conventional titanium-, cobalt- and nickel-based catalysts for polymerization of conjugated diene; higher activity on polymerization compared to the neodymium catalytic system containing no methyl alumoxane co-catalyst; and less aluminum residue after polymerization compared to the neodymium catalytic system containing a methyl alumoxane co-catalyst. The catalyst for polymerization of conjugated diene according to the present invention has higher activity on polymerization, larger ease of handling, and lower catalyst cost compared to catalyst systems of the metallocene type (Nd, Sm, Gd).

In the catalyst for polymerization of conjugated diene polymers according to the present invention, preferably, the (A) yttrium compound comprises an yttrium compound having a bulky ligand shown in Chemical Formula 2.

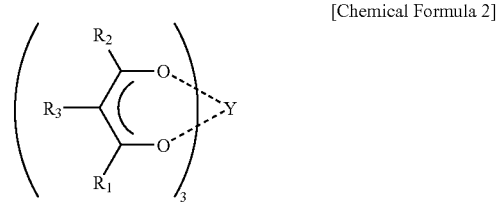

[Chemical Formula 2]

where $R_1$, $R_2$, $R_3$ denote hydrogen or a substituent having 1-12 carbon atoms; O denotes an oxygen atom; and Y denotes an yttrium atom.

In the catalyst for polymerization of conjugated diene according to the present invention, preferably, the conjugated diene polymers include a cis-1,4-polybutadiene having 90% or more of a cis-1,4 structure.

The present invention also provides a method of manufacturing conjugated diene polymers, comprising polymerizing a conjugated diene using the catalyst described above. In the method, preferably, the step of polymerizing the conjugated diene polymer includes adjusting a molecular weight by a compound selected from (1) hydrogen, (2) a hydrogenated metallic compound and (3) a hydrogenated organometallic compound. In this case, preferably, the hydrogenated organometallic compound comprises a dialkyl aluminum hydride.

To achieve the second object, the present invention provides a rubber composition for tires, comprising: (a) 10-90% by weight of a high-cis polybutadiene derived from polymerization of 1,3-butadiene in the presence of a catalyst comprising (A) an yttrium compound, (B) an ionic compound including a non-coordinate anion and a cation, and (C) an organometallic compound including an element selected from the groups 2, 12, 13 of the periodic table; (b) 90-10% by weight of a diene-based rubber other than the (a) high-cis polybutadiene; and (c) 1-100 parts by weight of a rubber reinforcer mixed in 100 parts by weight of a rubber component (a)+(b).

To achieve the third object, the present invention provides a rubber composition for golf balls, comprising: a base polymer including a high-cis polybutadiene derived from polymerization of 1,3-butadiene in the presence of a catalyst comprising (A) an yttrium compound, (B) an ionic compound including a non-coordinate anion and a cation, and (C) an organometallic compound including an element selected from the groups 2, 12, 13 of the periodic table; and 10-50 parts by weight of a crosslinking coagent mixed in 100 parts by weight of the base polymer.

In the rubber composition for tires and the rubber composition for golf balls according to the present invention, preferably, the high-cis polybutadiene has a molecular weight adjusted by a compound selected from (1) hydrogen, (2) a hydrogenated metallic compound and (3) a hydrogenated organometallic compound. In addition, preferably, the hydrogenated organometallic compound comprises a dialkyl aluminum hydride. In the rubber, composition for tires and the rubber composition for golf balls according to the present invention, preferably, the high-cis polybutadiene comprises a cis-1,4-polybutadiene having 90% or more of a cis-1,4 structure.

Effects of the Invention

Thus, the present invention is possible to provide a catalyst for polymerization of conjugated diene, which facilitates manufacture of a conjugated diene polymer with a high 1,4-cis structure content, leaves less aluminum residue on polymerization, and has high activity, and a method of manufacturing conjugated diene polymers using the catalyst. The present invention is also possible to provide a rubber composition for tires, having excellent abrasion resistance and flex crack-growth endurance and improved heat radiation. The present invention is further possible to provide a rubber composition for golf balls, having maintained hardness and high rebound together with excellent processability.

PREFERRED EMBODIMENTS OF THE INVENTION

Preferably usable examples of the yttrium compound of the (A) component in the catalytic system of the present invention include salts and complexes of yttrium. Particularly preferable examples include salts of yttrium such as yttrium trichloride, yttrium tribromide, yttrium triiodide, yttrium nitrate, yttrium sulfate, yttrium trifluoromethane sulfonate, yttrium acetate, yttrium trifluoro acetate, yttrium malonate, octylic acid (ethyl hexanoic acid) salt of yttrium, yttrium naphthenate, versatic acid salt of yttrium, and yttrium neodecanate; alkoxides such as yttrium trimethoxide, yttrium triethoxide, yttrium triisopropoxide, yttrium tributoxide, and yttrium triphenoxide; organic yttrium compounds such as tris(acetylacetonate)yttrium, tris(hexane dionate)yttrium, tris (heptane dionate)yttrium, tris(dimethyl heptane dionate) yttrium, tris(tetramethyl heptane dionate)yttrium, tris(acetoacetate)yttrium, cyclopentadienyl yttrium dichloride, dicyclopentadienyl yttrium dichloride, and tricyclopentadienyl yttrium; organobasic complexes such as pyridine complexes of yttrium salt and picoline complexes of yttrium salt; hydrates of yttrium salt; and alcohol complexes of yttrium salt. In particular, as the (A) component in the catalyst, an yttrium carboxylate such as yttrium acetate, yttrium trifluoro acetate, yttrium malonate, octylic acid (ethyl hexanoic acid) salt of yttrium, yttrium naphthenate, and yttrium neodecanate; or an yttrium compound such as tris(acetylacetonate) yttrium, tris(hexanedionate)yttrium, tris(heptanedionate)yttrium, tris(dimethylheptanedionate)yttrium, tris(tetramethyl heptanedionate)yttrium, and tris(acetoacetate)yttrium may be used. This use is effective to achieve a higher cis-1,4 content in conjugated diene polymers compared to the use of neodymium carboxylate.

An yttrium compound having a bulky ligand shown in Chemical Formula 3 can be used.

[Chemical Formula 3]

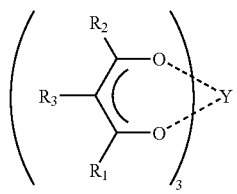

where $R_1$, $R_2$, $R_3$ denote hydrogen or a substituent having 1-12 carbon atoms; O denotes an oxygen atom; and Y denotes an yttrium atom.

Specific examples of $R_1$, $R_2$, $R_3$ include hydrogen, methyl group, ethyl group, vinyl group, n-propyl group, isopropyl group, 1-propenyl group, allyl group, n-butyl group, s-butyl group, isobutyl group, t-butyl group, n-pentyl group, 1-methyl butyl group, 2-methyl butyl group, 3-methyl butyl group, 1,1-dimethyl propyl group, 1,2-dimethyl propyl group, 2,2-dimethylpropyl group, hexyl group, heptyl group, octyl group, nonyl group, decyl group, undecyl group, dodecyl group, cyclohexyl group, methyl cyclohexyl group, ethyl cyclohexyl group, phenyl group, benzyl group, tolyl group, and phenethyl group. Further, they may contain hydroxyl group, carboxyl group, carbomethoxy group, carboethoxy group, amido group, amino group, alkoxy group, and phenoxy group, which may be substituted at an arbitrary position.

As the above yttrium compound, a salt or complex of yttrium is preferably used. Particularly preferable examples include yttrium compounds such as tris(acetyl acetonate)yttrium, tris(hexane dionate)yttrium, tris(heptane dionate)yttrium, tris(dimethyl heptane dionate)yttrium, tris(trimethyl heptane dionate)yttrium, tris(tetra methyl heptane dionate) yttrium, tris(penta methyl heptane dionate) yttrium, tris(hexamethyl heptane dionate)yttrium, and tris(acetoacetate)yttrium. In particular, the use of yttrium having such a bulky ligand as the (A) component in the catalyst system is effective because the activity is higher than when neodymium having a similarly bulky ligand is used.

The (B) component in the catalytic system of the present invention is an ionic compound including a non-coordinate anion and a cation. In this case, examples of the non-coordinate anion include tetra(phenyl)borate, tetra(fluoro phenyl) borate, tetrakis(difluorophenyl)borate, tetrakis(trifluorophenyl)borate, tetrakis(tetrafluorophenyl)borate, tetrakis (pentafluorophenyl)borate, tetrakis (3,5-bis(trifluoromethyl) phenyl)borate, tetrakis(tetrafluoro methyl phenyl)borate, tetra(tolyl)borate, tetra(xylyl)borate, triphenyl(pentafluorophenyl)borate, tris(pentafluorophenyl)phenyl borate, tridecahydride-7,8-dicarbaundeca borate, tetrafluoro borate, and hexafluoro phosphate.

On the other hand, examples of the cation include carbonium cation, oxonium cation, ammonium cation, phosphonium cation, cycloheptatrienyl cation, and ferrocenium cation.

Specific examples of the carbonium cation include triphenylcarbonium cation and tri-substituted carbonium cations such as tri-substituted phenyl carbonium cation. Specific examples of the tri-substituted phenyl carbonium cation include tri(methylphenyl)carbonium cation and tri(dimethyl phenyl)carbonium cation.

Specific examples of the ammonium cation include trialkyl ammonium cations such as trimethyl ammonium cation, triethyl ammonium cation, tripropyl ammonium cation, tributyl ammonium cation, and tri(n-butyl)ammonium cation; N,N-dialkyl anilinium cations such as N,N-dimethyl anilinium cation, N,N-diethyl an cation, and N,N-2,4,6-pentamethyl anilinium cation; and dialkyl ammonium cations such as di(i-propyl)ammonium cation, and dicyclohexyl ammonium cation.

Specific examples of the phosphonium cation include aryl phosphonium cations such as triphenyl phosphonium cation, tetraphenyl phosphonium cation, tri(methylphenyl)phosphonium cation, tetra(methylphenyl)phosphonium cation, tri (dimethyl phenyl)phosphonium cation, and tetra(dimethylphenyl)phosphonium cation.

The ionic compound may preferably include a combination of a non-coordinate anion and a cation, arbitrarily selected from the above examples.

In particular, preferable examples of the ionic compound include triphenylcarbonium tetrakis(pentafluoro phenyl)borate, triphenylcarbonium tetrakis(fluorophenyl)borate, N,N-dimethyl anilinium tetrakis(pentafluorophenyl)borate, and 1,1'-dimethylferrocenium tetrakis(pentafluoro phenyl)borate. The ionic compound may be employed solely or in combination of two or more.

The (B) component may include alumoxane. Examples of the alumoxane include a chain aluminoxane and a cyclic aluminoxane produced by bringing an organoaluminum compound into contact with a condensation agent and represented by a general formula (—Al(R')O-)n. (R' denotes a hydrocarbon group having 1-10 carbon atoms and including a halogen atom and/or an alkoxy group partly substituted; and n denotes the degree of polymerization, which is equal to 5 or more, preferably 10 or more). Examples of R' include methyl, ethyl, propyl, and isobutyl groups. The methyl group is preferable. Examples of the organoaluminum compound for use in material of aluminoxane include trialkyl aluminum such as trimethyl aluminum, triethyl aluminum, and triisobutyl aluminum, and mixtures thereof.

Among those, the alumoxane including a mixture of trimethyl aluminum and tributyl aluminum as material may be employed suitably.

Examples of the condensation agent include water typically and any other agents that allow for condensation reaction with the trialkyl aluminum, for example, water adsorbed on such as inorganic substance, and diol.

The (C) component in the catalytic system of the present invention is an organometallic compound of an element in the group 2, 12, 13 of the periodic table. In this case, examples of the organometallic compound include organo magnesium, organozinc, and organoaluminum. Preferable examples in these compounds include dialkyl magnesium, alkyl magnesium chloride, alkyl magnesium bromide, dialkyl zinc, trialkyl aluminum, dialkyl aluminum chloride, dialkyl aluminum bromide, alkyl aluminum sesqui chloride, alkyl aluminum sesqui bromide, alkyl aluminum dichloride, and dialkyl aluminum hydride.

Specific compounds include alkyl magnesium halides such as methyl magnesium chloride, ethyl magnesium chloride, butyl magnesium chloride, hexyl magnesium chloride, octyl magnesium chloride, ethyl magnesium bromide, butyl magnesium bromide, butyl magnesium iodide, and hexyl magnesium iodide.

Further examples include dialkyl magnesium such as dimethyl magnesium, diethyl magnesium, dibutyl magnesium, dihexyl magnesium, dioctyl magnesium, ethyl butyl magnesium, and ethyl hexyl magnesium.

Further examples include dialkyl zinc such as dimethyl zinc, diethyl zinc, diisobutyl zinc, dihexyl zinc, dioctyl zinc, and didecyl zinc.

Further examples include trialkyl aluminum such as trimethyl aluminum, triethyl aluminum, triisobutyl aluminum, trihexyl aluminum, trioctyl aluminum, and tridecyl aluminum.

Further examples include dialkyl aluminum chlorides such as dimethyl aluminum chloride, and diethyl aluminum chloride; organoaluminum halides such as ethyl aluminum sesqui chloride, and ethyl aluminum dichloride; and hydrogenated organoaluminum compounds such as diethyl aluminum hydride, diisobutyl aluminum hydride, and ethyl aluminum hydride.

The element in the group 2, 12, 13 of the periodic table may be employed solely or in combination of two or more.

As conjugated diene can be polymerized in the presence of the above-described catalyst while the molecular weight of the resultant conjugated diene polymer can be adjusted with an agent, which may include a compound selected from (1) hydrogen, (2) a hydrogenated metallic compound and (3) a hydrogenated organometallic compound.

Examples of the (2) hydrogenated metallic compound serving as the molecular weight adjusting agent of the present invention include lithium hydride, sodium hydride, potassium hydride, magnesium hydride, calcium hydride, borane, aluminum hydride, gallium hydride, silane, germane, lithium borohydride, sodium borohydride, lithium aluminum hydride, and sodium aluminum hydride.

Examples of the (3) hydrogenated organometallic compound serving as the molecular weight adjusting agent of the present invention include alkyl borane such as methyl borane, ethyl borane, butyl borane, and phenyl borane; dialkyl borane such as dimethyl borane, diethyl borane, dipropyl borane, dibutyl borane, and diphenyl borane; alkyl aluminum dihydride such as methyl aluminum dihydride, ethyl aluminum dihydride, propyl aluminum dihydride, butyl aluminum dihydride, and phenyl aluminum dihydride; dialkyl aluminum hydride such as dimethyl aluminum hydride, diethyl aluminum hydride, dipropyl aluminum hydride, dibutyl aluminum hydride, and diphenyl aluminum hydride; silanes such as methyl silane, ethyl silane, propyl silane, butyl silane, phenyl silane, dimethyl silane, diethyl silane, dipropyl silane, dibutyl silane, diphenyl silane, trimethyl silane, triethyl silane, tripropyl silane, tributyl silane, and triphenyl silane; and germanes such as methyl germane, ethyl germane, propyl germane, butyl germane, phenyl germane, dimethyl germane, diethyl germane, dipropyl germane, dibutyl germane, diphenyl germane, trimethyl germane, triethyl germane, tripropyl germane, tributyl germane, and triphenyl germane.

Among those, diisobutyl aluminum hydride and diethyl aluminum hydride are preferable, and diethyl aluminum hydride is particularly preferable.

The catalyst components can be added in any order not particularly limited though they may be added in the following order.

(1) In an inactive organic solvent, in the presence or absence of a conjugated diene compound monomer to be polymerized, the (C) component is added, then the (A) component and the (B) component are added in any arbitrary order.

(2) In an inactive organic solvent, in the presence or absence of a conjugated diene compound monomer to be polymerized, the (C) component is added, then the above-described molecular weight adjusting agent is added, and finally the (A) component and the (B) component are added in any arbitrary order.

(3) In an inactive organic solvent, in the presence or absence of a conjugated diene compound monomer to be polymerized, the (A) component is added, then the (C) component and the above-described molecular weight adjusting agent are added in any arbitrary order, and finally the (B) component is added.

(4) In an inactive organic solvent, in the presence or absence of a conjugated diene compound monomer to be polymerized, the (B) component is added, then the (C) component and the above-described molecular weight adjusting agent are added in any arbitrary order, and finally the (A) component is added.

(5) In an inactive organic solvent, in the presence or absence of a conjugated diene compound monomer to be polymerized, the (C) component is added, then the (A) component and the (B) component are added in any arbitrary order, and finally the above-described molecular weight adjusting agent is added.

The components may be previously matured for use. In particular, it is preferable to mature the (A) component and the (C) component.

The condition for maturing requires that, in an inactive solvent, in the presence or absence of a conjugated diene compound monomer to be polymerized, the (A) component is mixed with the (C) component. The temperature for maturing is −50 to 80° C., preferably −10 to 50° C. The time for maturing is 0.01-24 hours, preferably 0.05-5 hours, and particularly 0.1-1 hour.

In the present invention each catalyst component may be held on an inorganic compound or an organic high molecular compound and used.

Examples of the conjugated diene compound monomer include 1,3-butadiene, isoprene, 1,3-pentadiene, 2-ethyl-1,3-butadiene, 2,3-dimethyl butadiene, 2-methyl pentadiene, 4-methyl pentadiene, and 2,4-hexadiene. In particular, a conjugated diene compound monomer mainly including 1,3-butadiene is preferable.

These monomer components may be employed solely or in combination of two or more.

The conjugated diene compound monomer to be polymerized may comprise all or part of monomers. Where it comprises part of monomers, the above-described contact mixture may be mixed with the remainder of monomers or the remainder of monomer solutions. In addition to the conjugated diene, it may contain olefin compounds such as ethylene, propylene, allene, 1-butene, 2-butene, 1,2-butadiene, pentene, cycle pentene, hexene, cyclohexane, octene, cyclooctadiene, cyclo dodecatriene, norbornene, and norobornadiene.

There is no restriction in polymerization methods. Applicable examples include bulk polymerization in which the conjugated diene compound monomer such as 1,3-butadiene itself is used as a polymerization solvent, and solution polymerization. Examples of the solvent in the bulk polymerization include aliphatic hydrocarbon such as butane, pentane, hexane, and heptane; alicyclic hydrocarbon such as cyclopentane, and cyclohexane; aromatic hydrocarbon such as benzene, toluene, xylene, and ethyl benzene; the above-described olefin compounds; and olefin-based hydrocarbon such as cis-2-butene, and trans-2-butene.

In particular, benzene, toluene, cyclohexane, and a mixture of cis-2-butene and trans-2-butene are preferably used.

The temperature for polymerization falls preferably within a range of −30 to 150° C., particularly within a range of 30 to 100° C. The time for polymerization falls preferably within a range of one minute to 12 hours, particularly 5 minutes to 5 hours.

After polymerization is executed for a certain period of time, if required, the polymerization chamber is subjected to releasing pressure from inside and post-treatments such as washing and drying.

The resultant conjugated diene polymer in the present invention may comprise a cis-1,4-polybutadiene having a cis-1,4 structure by, preferably 90% or more, further preferably 92% or more, and particularly 96% or more. The conjugated diene polymer is controlled to have [η] of, preferably 0.1-10, further preferably 1-7, and particularly 1.5-5.

In the rubber composition for tires according to the present invention, examples of the (b) diene-based rubber other than (a) include high-cis polybutadiene rubber, low-cis polybutadiene rubber (BR), emulsion-polymerized or solution-polymerized styrene butadiene rubber (SBR), natural rubber, polyisoprene rubber, ethylene propylene diene rubber (EDM), nitrile rubber (NBR), butyl rubber (IIR), and chloroprene rubber (CR).

In addition, derivatives of these rubbers, for example, polybutadiene rubbers modified with tin compounds, and the above rubbers epoxy-modified, silane-modified, and maleic acid-modified can be employed. These rubbers may be employed solely or in combination of two or more.

In the rubber composition for tires according to the present invention, examples of the (c) rubber reinforcer include inorganic reinforcers such as various carbon blacks and white carbon, activated calcium carbonate, ultra-particulate magnesium silicate; and organic reinforcers such as syndiotactic 1,2-polybutadiene, polyethylene resin, polypropylene resin, high styrene resin, phenol resin, lignin, modified melanin resin, coumarone indene resin, and petroleum resin. Particularly preferable examples include carbon black having a particle diameter less than 90 nm and dibutyl phthalate (DBR) oil absorption more than 70 ml/100 g, such as FEF, FF, GPF, SAF, ISAF, SRF, HAF.

Preferably, the syndiotactic 1,2-polybutadiene has a melting point higher than 110° C. The syndiotactic 1,2-polybutadiene may be produced with a suspension polymerization method described in JP-A 9-20811. It can be produced, in the presence of butadiene, using a catalyst, comprising: a matured liquid (A component) obtained by bringing a cobalt compound, a group I-III organometallic compound or hydrogenated metallic compound, and a compound selected from the group consisting of ketone, carboxylate, nitrile, sulfoxide, amide and phosphate into contact with each other; and a compound (B component) selected from the group consisting of carbon disulfide, phenyl isothiocyanate, and xanthogenate compounds. The melting point can be adjusted with a compound selected from the group consisting of ketone, carboxylate, nitrile, sulfoxide, amide and phosphate to fall within, preferably 110-200° C., particularly 130-160° C.

A solution polymerization method may also be employed with a catalytic system comprising soluble cobalt—organoaluminum compound—carbon disulfide—melting point adjusting agent.

The rubber composition for tires according to the present invention has a mixture proportion of 100 parts by weight of the rubber component (a)+(b), composed of 10-90% by weight of the specific high-cis polybutadiene (a) and 90-10% by weight of the diene-based rubber (b) other than (a), to 1-100 parts by weight of the rubber reinforcer (c).

A preferable proportion is of 100 parts by weight of the rubber component (a)+(b), composed of 20-80% by weight of the specific high-cis polybutadiene (a) and 80-20% by weight of the diene-based rubber (b) other than (a), to 5-80 parts by weight of a rubber reinforcer (c).

The rubber composition for tires according to the present invention can be produced by kneading the components using a Banbury mixer, an open roll, a kneader, and a double-axis kneader as performed usually.

The rubber composition for tires according to the present invention may be kneaded, if required, with compounding agents such as vulcanizing agent, vulcanizing auxiliary, antioxidant, filler, process oil, zinc white, and stearic acid, as usually employed in the rubber industry.

Available examples of the vulcanizing agent include publicly known vulcanizing agents, for example, sulfur, organic peroxide, resinous vulcanizing agent, metallic oxide such as magnesium oxide.

Available examples of the vulcanizing auxiliary include publicly known vulcanizing auxiliaries, for example, aldehydes, ammonias, amines, guanidines, thioureas, thiazoles, thiurams, dithiocarbamates, and xanthates.

Examples of the anti-oxidant include amine-ketone series, imidazole series, amine series, phenol series, sulfur series, and phosphorous series.

Examples of the filler include inorganic fillers such as calcium carbonate, basic magnesium carbonate, clay, litharge, and diatom earth; and organic fillers such as reclaimed rubber and powdered rubber.

Available examples of the process oil include aromatic series, naphthene series, and paraffin series.

The crosslinking coagent compounded in the rubber composition for golf balls according to the present invention comprises preferably a monovalent or divalent metal salt of α,β-ethylenic unsaturated carboxylic acid, of which specific examples include zinc diacrylate, basic zinc methacrylate, and zinc dimethacrylate. These metal salts of α,β-ethylenic unsaturated carboxylic acid may be mixed directly with the base material rubber in a normal method. Alternatively, into a rubber composition including a metal oxide such as zinc oxide previously kneaded therein, an α,β-ethylenic unsaturated carboxylic acid such as acrylic acid and methacrylic acid is added and kneaded. This causes reaction of the α,β-ethylenic unsaturated carboxylic acid with the metal oxide in the rubber composition, resulting in the metal salt of α,β-ethylenic unsaturated carboxylic acid.

Preferably, the compounded quantity of the crosslinking coagent is equal to 10-50 parts by weight to 100 parts by weight of the base material rubber. A compounded quantity of the crosslinking coagent less than the above range can not proceed crosslinking sufficiently, resulting in lowered rebound performance, shortened carry, and worsened durability. In contrast, a compounded quantity of the crosslinking coagent more than the above range results in excessive large compression, which worsens the feeling of impact.

In the rubber composition for golf balls according to the present invention, preferably, a rubber composition contained in the gummy portion is mixed with peroxides as an essential component, in addition to the crosslinking coagent.

The peroxides act as the initiator for crosslinking, grafting and polymerizing the rubber and the crosslinking coagent. Suitable examples of the peroxides include dicumyl peroxide, and 1,1-bis(t-butyl peroxy)3,3,5-trimethyl cyclohexane.

Preferably, the compounded quantity of the peroxides is equal to 0.2-5 parts by weight to 100 parts by weight of the base material rubber. A compounded quantity of the peroxides less than the above range can not proceed crosslinking sufficiently, resulting in lowered rebound performance, shortened carry, and worsened durability. In contrast, a compounded quantity of the peroxides more than the above range results in over curing (excessive crosslinking) and accordingly crispness, which worsens durability.

In the rubber composition for golf balls according to the present invention, a zinc oxide, also serving as a crosslinking auxiliary may be mixed if the crosslinking coagent is zinc acrylate or zinc methacrylate. Further, a filler such as barium sulfate, an anti-oxidant, and an additive such as zinc stearate may be mixed, if required.

EXAMPLES

The catalyst for polymerization of conjugated diene according to the present invention was used to produce polybutadiene as the conjugated diene polymer. Examples thereof are described next with polymerization conditions and polymerization results shown in Tables 1-7.

A microstructure was determined through the infrared absorption spectrum analysis. The microstructure was calculated from an absorption intensity ratio with Cis 740 $cm^{-1}$, Trans 967 $cm^{-1}$, Vinyl 910 $cm^{-1}$.

An inherent viscosity [η] was measured at 30° C. using a solution of polymer in toluene.

Example 1

An autoclave with an inner volume of 2 L was provided. The inside thereof was substituted by nitrogen, and a solution of 260 ml of toluene and 140 ml of butadiene was brought therein. The temperature of the solution was elevated up to 30° C., then 2 ml of a solution of triethyl aluminum (TEA) in toluene (1 mol/L) was added, followed by agitation for 3 minutes at 500 rpm. Next, 2 ml of a solution of yttrium triisopropoxide in toluene (0.1 mol/L) was added, and heated up to 40° C. After agitation for 3 minutes, 1 ml of a solution of triphenyl carbenium tetrakis (pentafluoro phenyl)borate in toluene (0.43 mol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 1.

Example 2

Except for the solution of triethyl aluminum (TEA) in toluene (1 mol/L) added by a volume of 4 ml, polymerization was performed similar to Example 1. The polymerization result is shown in Table 1.

Example 3

Except for the solution of triethyl aluminum (TEA) in toluene (5 mol/L) added by a volume of 1.2 ml, polymerization was performed similar to Example 1. The polymerization result is shown in Table 1.

Comparative Example 1

Except for the use of tris(pentafluoro phenyl)borane instead of triphenyl carbenium tetrakis(pentafluoro phenyl) borate, polymerization was performed similar to Example 3. Any polymer could not be produced at all.

Example 4

Except for the solution of triethyl aluminum (TEA) in toluene (5 mol/L) added by a volume of 2.4 ml, polymerization was performed similar to Example 1. The polymerization result is shown in Table 1.

Comparative Example 2

Except for the use of methyl alumoxane instead of triethyl aluminum (TEA) and without the use of triphenyl carbenium tetrakis(pentafluoro phenyl)borate, polymerization was performed similar to Example 4. Any polymer could not be produced at all.

Example 5

Except for the solution of yttrium triisopropoxide in toluene (0.1 mol/L) added by a volume of 0.8 ml, polymerization was performed similar to Example 2. The polymerization result is shown in Table 1.

Example 6

Except for the solution of triethyl aluminum (TEA) in toluene (2 mol/L) added by a volume of 3.2 ml, polymerization was performed similar to Example 5. The polymerization result is shown in Table 1.

Example 7

Except for the solution of triethyl aluminum (TEA) in toluene (2 mol/L) added by a volume of 4.8 ml, polymerization was performed similar to Example 5. The polymerization result is shown in Table 1.

TABLE 1

| Example No | Y(OiPr)3 mM | Al | [Al] mM | Activity gPB/mmol-Y.h | Microstructure (%) Cis | Trans | Vinyl | [η] |
|---|---|---|---|---|---|---|---|---|
| 1 | 0.5 | TEA | 5 | 112 | 97.8 | 1.5 | 0.7 | 4.9 |
| 2 | 0.5 | TEA | 10 | 309 | 95.2 | 3.8 | 1.0 | 1.7 |
| 3 | 0.5 | TEA | 15 | 395 | 93.9 | 4.9 | 1.2 | 1.4 |
| 4 | 0.5 | TEA | 30 | 358 | 89.2 | 9.5 | 1.3 | 1.0 |
| 5 | 0.2 | TEA | 10 | 287 | 94.9 | 4.2 | 0.9 | 1.9 |
| 6 | 0.2 | TEA | 16 | 438 | 92.0 | 6.9 | 1.1 | 1.3 |
| 7 | 0.2 | TEA | 24 | 450 | 89.9 | 8.8 | 1.3 | 1.1 |
| Comparative Example | | | | | | | | |
| 1 | 0.5 | TEA | 15 | 0 | — | — | — | — |
| 2 | 0.5 | MMAO | 30 | 0 | — | — | — | — |

Polymerization Conditions: Toluene + Bd = 400 ml (Bd 140 ml), B/Y = 2, Polymerization Temperature 40° C., Polymerization Time 30 min.
Adding Order: Toluene - Bd - 30° C. -TEA - 3 min - Y - 40° C. - B

Example 8

Except for the agitation time determined 10 minutes after addition of the solution of yttrium triisopropoxide in toluene, polymerization was performed similar to Example 1. The polymerization result is shown in Table 2.

Example 9

Except for the agitation time determined 20 minutes after addition of the solution of yttrium triisopropoxide in toluene, polymerization was performed similar to Example 1. The polymerization result is shown in Table 2.

Example 10

Except for the agitation time determined 30 minutes after addition of the solution of yttrium triisopropoxide in toluene, polymerization was performed similar to Example 1. The polymerization result is shown in Table 2.

TABLE 2

| Example No | Mature Time min | Yield g/l | Activity gPB/mmol-Y.h | Microstructure (%) Cis | Trans | Vinyl | [η] |
|---|---|---|---|---|---|---|---|
| 1 | 3 | 28.0 | 112 | 97.8 | 1.5 | 0.7 | 4.9 |
| 8 | 10 | 52.8 | 211 | 97.3 | 1.9 | 0.8 | 3.7 |
| 9 | 20 | 66.4 | 266 | 96.9 | 2.3 | 0.8 | 3.4 |
| 10 | 30 | 67.8 | 271 | 97.0 | 2.2 | 0.8 | 3.5 |

Polymerization Conditions: Toluene + Bd = 400 ml (Bd 140 ml), Borate/Y = 2, Polymerization Temperature 40° C., Polymerization Time 30 min, Y(OiPr)3 0.5 mM, TEA 5 mM
Adding Order: Toluene - Bd - 30° C. - TEA - 3 min - Y - (Time Variation) - 40° C. - Borate

Example 11

Except for the use of diethyl aluminum hydride (DEAH) instead of triethyl aluminum (TEA), polymerization was performed similar to Example 1. The polymerization result is shown in Table 3.

Example 12

Except for the solution of diethyl aluminum hydride (DEAH) in toluene (1 mol/L) added by a volume of 3 polymerization was performed similar to Example 11. The polymerization result is shown in Table 3.

Example 13

Except for the solution of diethyl aluminum hydride (DEAH) in toluene (1 mol/L) added by a volume of 4 ml, polymerization was performed similar to Example 11. The polymerization result is shown in Table 3.

Example 14

Except for the solution of diethyl aluminum hydride (DEAH) in toluene (1 mol/L) added by a volume of 6 ml, polymerization was performed similar to Example 11. The polymerization result is shown in Table 3.

TABLE 3

| Example No | Y(OiPr)3 mM | DEAH mM | Yield g/l | Activity gPB/mmol-Y.h | Microstructure (%) Cis | Trans | Vinyl | [η] |
|---|---|---|---|---|---|---|---|---|
| 11 | 0.5 | 5.0 | 97.1 | 388 | 97.3 | 1.9 | 0.8 | 2.9 |
| 12 | 0.5 | 7.5 | 55.7 | 223 | 97.1 | 1.9 | 1.0 | 1.7 |
| 13 | 0.5 | 10.0 | 39.5 | 158 | 98.3 | 1.0 | 0.7 | 1.4 |
| 14 | 0.5 | 15.0 | 80.0 | 320 | 98.4 | 0.9 | 0.7 | 1.1 |

Polymerization Conditions: Toluene + Bd = 400 ml (Bd 140 ml), Borate/Y = 2, Polymerization Temperature 40° C., Polymerization Time 30 min.
Adding Order: Toluene - Bd - 30° C. - DEAH - 3 min - Y - 40° C. - Borate

Example 15

An autoclave with an inner volume of 2 L was provided. The inside thereof was substituted by nitrogen, and a solution of 260 ml of toluene and 140 ml of butadiene was brought therein. The temperature of the solution was elevated up to 30° C., then 2 ml of a solution of triethyl aluminum (TEA) in toluene (1 mol/L) was added, followed by agitation for 3 minutes at 500 rpm. Next, 2 ml of a solution of yttrium triisopropoxide in toluene (0.1 mol/L) was added, and heated up to 40° C. After agitation for 3 minutes, 1 ml of a solution of triphenyl carbenium tetrakis (pentafluoro phenyl)borate in toluene (0.43 mol/L), and 0.4 ml of a solution of dibutyl magnesium in heptane (1 mol/L) were added to initiate polymerization. After polymerization at 40° C. for 30 minutes, 5 ml of a solution of ethanol/heptane (1/1) containing an antioxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 4.

Example 16

Except for the solution of dibutyl magnesium in heptane (1 mol/L) added by a volume of 0.8 ml, polymerization was performed similar to Example 15. The polymerization activity was extremely high and the polymerization was terminated after 25 minutes. The polymerization result is shown in Table 1.

Example 17

Except for the solution of dibutyl magnesium in heptane (1 mol/L) added by a volume of 2 ml, polymerization was performed similar to Example 15. The polymerization result is shown in Table 4.

Example 18

An autoclave with an inner volume of 21, was provided. The inside thereof was substituted by nitrogen, and a solution of 260 ml of toluene and 140 ml of butadiene was brought therein. The temperature of the solution was elevated up to 30° C., then 0.8 ml of a solution of triethyl aluminum (TEA) in toluene (1 mol/L) was added, followed by agitation for 3 minutes at 500 rpm. Next, 0.8 ml of a solution of yttrium triisopropoxide in toluene (0.1 mol/L) was added, and heated up to 40° C. After agitation for 3 minutes, 0.4 ml of a solution of triphenyl carbenium tetrakis(pentafluoro phenyl)borate in toluene (0.43 mol/L), and 0.16 ml of a solution of dibutyl magnesium in heptane (1 mol/L) were added to initiate polymerization. After polymerization at 40° C. for 30 minutes, 5 ml of a solution of ethanol/heptane (1/1) containing an antioxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 4.

Example 19

Except for the solution of dibutyl magnesium in heptane (1 mol/L) added by a volume of 0.32 ml, polymerization was performed similar to Example 18. The polymerization activity was extremely high and the polymerization was terminated after 21 minutes. The polymerization result is shown in Table 4.

Example 20

Except for the solution of dibutyl magnesium in heptane (1 mol/L) added by a volume of 0.8 ml, polymerization was performed similar to Example 18. The polymerization result is shown in Table 4.

Example 21

An autoclave with an inner volume of 2 L was provided. The inside thereof was substituted by nitrogen, and a solution of 260 ml of toluene and 140 ml of butadiene was brought therein. The temperature of the solution was elevated up to 30° C., then 0.4 ml of a solution of triethyl aluminum (TEA) in toluene (1 mol/L) was added, followed by agitation for 3 minutes at 500 rpm. Next, 0.4 ml of a solution of yttrium triisopropoxide in toluene (0.1 mol/L) was added, and heated up to 40° C. After agitation for 3 minutes, 0.2 ml of a solution of triphenyl carbenium tetrakis(pentafluoro phenyl)borate in toluene (0.43 mol/L), and 0.16 ml of a solution of dibutyl magnesium in heptane (1 mol/L) were added to initiate polymerization. After polymerization at 40° C. for 30 minutes, 5 ml of a solution of ethanol/heptane (1/1) containing an antioxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 4.

Example 22

Except for the solution of triethyl aluminum (TEA) in heptane (1 mol/L) added by a volume of 0.8 ml, polymerization was performed similar to Example 21. The polymerization result is shown in Table 4.

Example 23

Except for the solution of triethyl aluminum (TEA) in heptane (1 mol/L) added by a volume of 2 ml, polymerization was performed similar to Example 21. The polymerization result is shown in Table 4.

TABLE 4

| Example No | Y(OiPr)3 mM | TEA mM | Bu$_2$Mg mM | Poly Time min | Yield g/l | Activity gPB/ mmol-Y.h | Microstructure (%) Cis | Trans | Vinyl | [η] |
|---|---|---|---|---|---|---|---|---|---|---|
| 15 | 0.5 | 5.0 | 1.0 | 30 | 89 | 355 | 93.0 | 5.6 | 1.4 | 0.9 |
| 16 | 0.5 | 5.0 | 2.0 | 25 | 184 | 885 | 91.3 | 7.6 | 1.1 | 1.6 |
| 17 | 0.5 | 5.0 | 5.0 | 30 | 48 | 191 | 86.0 | 12.2 | 1.8 | 0.4 |
| 18 | 0.2 | 2.0 | 0.4 | 30 | 7 | 67 | 95.1 | 3.7 | 1.2 | 0.9 |
| 19 | 0.2 | 2.0 | 0.8 | 21 | 140 | 2000 | 95.9 | 3.2 | 0.9 | 2.7 |
| 20 | 0.2 | 2.0 | 2.0 | 30 | 41 | 410 | 93.0 | 5.6 | 1.4 | 0.7 |
| 21 | 0.1 | 1.0 | 0.4 | 30 | 93 | 1860 | 97.0 | 2.1 | 0.9 | 4.0 |
| 22 | 0.1 | 2.0 | 0.4 | 30 | 96 | 1930 | 96.2 | 2.9 | 0.9 | 2.9 |
| 23 | 0.1 | 5.0 | 0.4 | 30 | 29 | 590 | 95.2 | 3.7 | 1.1 | 1.2 |

Poly Time: Polymerization Time
Polymerization Conditions: Toluene + Bd = 400 ml (Bd 140 ml), Borate/Y = 2, Polymerization Temperature 40° C.
Adding Order: Toluene - Bd - 30° C. - TEA - 3 min - Y - 40° C. - Borate - Bu$_2$Mg

Example 24

An autoclave with an inner volume of 2 l, was provided. The inside thereof was substituted by nitrogen, and a solution of 260 ml of toluene and 140 ml of butadiene was brought therein. The temperature of the solution was elevated up to 30° C., then a hydrogen gas is supplied at a partial pressure of 1.0 Kg/cm$^2$, and 2 ml of a solution of triethyl aluminum (TEA) in toluene (1 mol/L) was added, followed by agitation for 3 minutes at 500 rpm. Next, 2 ml of a solution of yttrium triisopropoxide in toluene (0.1 mol/L) was added, and heated up to 40° C. After agitation for 3 minutes, 1 ml of a solution of triphenyl carbenium tetrakis(pentafluoro phenyl)borate in toluene (0.43 mol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum ate 70° C. for 6 hours. The polymerization result, is shown in Table 5.

Example 25

Except for the partial pressure of the hydrogen gas supplied at 2.75 Kg/cm$^2$, polymerization was performed similar to Example 24. The polymerization result is shown in Table 5.

TABLE 5

| Run No | Y(OiPr)$_3$ mM | H$_2$ Partial Pressure kgf/cm$^2$ | Yield g/l | Activity gPB/ mmol-Y.h | Microstructure (%) Cis | Trans | Vinyl | [η] |
|---|---|---|---|---|---|---|---|---|
| 1 | 0.5 | 0 | 34.2 | 112 | 97.8 | 1.5 | 0.7 | 4.9 |
| 24 | 0.5 | 1.0 | 31.5 | 126 | 97.6 | 1.6 | 0.8 | 3.5 |
| 25 | 0.5 | 2.75 | 30.5 | 122 | 97.8 | 1.6 | 0.6 | 3.0 |

Polymerization Conditions: Toluene FB = 400 ml (Bd 140 ml), Y(OiPr)$_3$ 0.5 mM, Al/Y = 10, B/Y = 2, 40° C. × 30 min.
Adding Order: Toluene - Bd - H$_2$ - 30° C. - TEA - 3 min - Y - 40° C. - Borate

Example 26

An autoclave with an inner volume of 2 l, was provided. The inside thereof was substituted by nitrogen, and a solution of 260 ml of toluene and 140 ml of butadiene was brought therein. The temperature of the solution was elevated up to 30° C., then 2.5 ml of a slurry of lithium aluminum hydride in toluene (30 g/L), and 2 ml of a solution of triethyl aluminum (TEA) in toluene (1 mol/L) were added, followed by agitation for 3 minutes at 500 rpm. Next, 2 ml of a solution of yttrium triisopropoxide in toluene (0.1 mol/L) was added, and heated up to 40° C. After agitation for 3 minutes, 1 ml of a solution of triphenyl carbenium tetrakis(pentafluoro phenyl)borate in toluene (0.43 mol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 6.

Example 27

Except for the slurry of lithium aluminum hydride in toluene added by 5 ml, polymerization was performed similar to Example 26. The polymerization result is shown in Table 6.

TABLE 6

| Run No | TEA mM | LiAlH$_4$ mM | Al/Y | Yield g/l | Activity gPB/ mmol-Y.h | Microstructure (%) Cis | Trans | Vinyl | [η] |
|---|---|---|---|---|---|---|---|---|---|
| 1 | 5.0 | 0 | 10 | 34.2 | 112 | 97.8 | 1.5 | 0.7 | 4.9 |
| 26 | 5.0 | 5 | 20 | 35.0 | 175 | 96.7 | 2.4 | 0.9 | 3.4 |
| 27 | 5.0 | 10 | 30 | 47.5 | 238 | 95.7 | 3.2 | 1.1 | 2.5 |

Polymerization Conditions: Toluene FB = 400 ml (Bd 140 ml), Y(OiPr)$_3$ 0.5 mM, Borate/Y = 2, 40° C. × 30 min.
Adding Order: Toluene FB - 30° C. - TEA - LiAlH4 - 3 min - Y - 40° C. - Borate

Example 28

An autoclave with an inner volume of 2 L was provided. The inside thereof was substituted by nitrogen, and a solution of 260 ml of toluene and 140 ml of butadiene was brought therein. The temperature of the solution was elevated up to 30° C., then 2 ml of a solution of diethyl aluminum hydride (DEAH) in toluene (1 mol/L) was added, followed by agitation for 3 minutes at 500 rpm. Next, 2 ml of a solution of yttrium octylate in toluene (0.1 mol/L) was added, and heated up to 40° C. After agitation for 3 minutes, 1 ml of a solution of triphenyl carbenium tetrakis(pentafluoro phenyl)borate in toluene (0.43 mol/L) was added to initiate polymerization. After polymerization at 40° C. for 25 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 7. Because of an excessive high molecular weight, the microstructure and inherent viscosity can not be measured.

Example 29

Except for the solution of diethyl aluminum hydride (DEAN) in toluene (1 mol/L) added by 3 ml, and the polymerization time determined 30 minutes, polymerization was performed similar to Example 28. The polymerization result is shown in Table 7.

Example 30

Except for the solution of diethyl aluminum hydride (DEAH) in toluene (1 mol/L) added by 4 ml, polymerization was performed similar to Example 25. The polymerization result is shown in Table 7.

Example 31

Except for the solution of diethyl aluminum hydride (DEAH) in toluene (2 mol/L) added by 3 ml, polymerization was performed similar to Example 25. The polymerization result is shown in Table 7.

Example 32

Except for the solution of diethyl aluminum hydride (DEAH) in toluene (2 mol/L) added by 5 ml, polymerization was performed similar to Example 25. The polymerization result is shown in Table 7.

Example 33

An autoclave with an inner volume of 2 L was provided. The inside thereof was substituted by nitrogen, and a solution of 260 ml of toluene and 190 ml of butadiene was brought therein. The temperature of the solution was elevated up to 30° C., then 2 ml of a solution of triethyl aluminum (TEA) in toluene (1 mol/L) was added, to followed by agitation for 3 minutes at 500 rpm. Next, 1 ml of a solution of tris(2,2,6,6-tetramethyl heptane-3,5-dionate)yttrium in toluene (40 mmol/L) was added, and heated up to 40° C. After agitation for 4 minutes, 0.2 ml of a solution of triphenyl carbenium tetrakis(pentafluoro phenyl)borate in toluene (0.43 mol/L) was added to initiate polymerization. After polymerization at 40° C. for 20 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 8.

Example 34

Except for the solution of triethyl aluminum (TEA) in toluene (5 mol/L) added by 1.2 ml, and the polymerization time determined 30 minutes, polymerization was performed similar to Example 33. The polymerization result is shown in Table 8.

Example 35

Except for the solution of tris(2,2,6,6-tetramethyl heptane-3,5-dionate)yttrium in toluene (40 mmol/L) added by 0.5 ml, the solution of triphenyl carbenium tetrakis(pentafluoro phenyl)borate in toluene (0.43 mol/L) added by 0.1 ml, the solution of triethyl aluminum (TEA) in toluene (1 mol/L) added by 1 ml, and the polymerization time determined 30 minutes, polymerization was performed similar to Example 1. The polymerization result is shown in Table 8.

Example 36

Except for the solution of triethyl aluminum (TEA) in toluene (1 mol/L) added by 2 ml, polymerization was performed similar to Example 3. The polymerization result is shown in Table 8.

Example 37

Except for the solution of triethyl aluminum (TEA) in toluene (2 mol/L) added by 2 ml, polymerization was performed similar to Example 3. The polymerization result is shown in Table 8.

TABLE 7

| Example | Y(Oct)3 | DEAH | Poly Time | Yield | Activity gPB/mmol- | Microstructure (%) | | | |
|---|---|---|---|---|---|---|---|---|---|
| No | mM | mM | min | g/l | Y.h | Cis | Trans | Vinyl | [η] |
| 28 | 0.5 | 5.0 | 25 | 45.1 | 216 | — | — | — | — |
| 29 | 0.5 | 7.5 | 30 | 38.8 | 155 | 99.0 | 0.4 | 0.6 | 4.5 |
| 30 | 0.5 | 10.0 | 30 | 41.0 | 164 | 98.5 | 0.9 | 0.6 | 2.2 |
| 31 | 0.5 | 15.0 | 30 | 60.8 | 243 | 98.6 | 0.7 | 0.7 | 1.3 |
| 32 | 0.5 | 25.0 | 30 | 83.7 | 335 | 98.2 | 1.1 | 0.7 | 0.9 |

Poly Time: Polymerization Time
Polymerization Conditions: Toluene + Bd = 400 ml (Bd 140 ml), Borate/Y = 2, Polymerization Temperature 40° C.
Adding Order: Toluene - Bd - 30° C. - DEAH - 3 min - Y - 40° C. - Borate

TABLE 8

| Example No | Y(tmhd)3 mM | TEA mM | Poly Time min | Yield g/l | Activity gPB/mmol-Y.h | Microstructure (%) | | | [η] |
|---|---|---|---|---|---|---|---|---|---|
| | | | | | | Cis | Trans | Vinyl | |
| 33 | 0.1 | 5.0 | 20 | 108.8 | 3,260 | 94.7 | 4.3 | 1.0 | 3.7 |
| 34 | 0.1 | 15.0 | 30 | 103.5 | 2,070 | 92.5 | 6.5 | 1.0 | 2.1 |
| 35 | 0.05 | 2.5 | 30 | 71.9 | 2,880 | 95.8 | 3.2 | 1.0 | 3.9 |
| 36 | 0.05 | 5.0 | 30 | 104.4 | 4,170 | 94.7 | 4.3 | 1.0 | 3.3 |
| 37 | 0.05 | 10.0 | 30 | 65.3 | 2,610 | 94.6 | 4.4 | 1.0 | 2.2 |

Poly Time: Polymerization Time
Polymerization Conditions: Toluene + Bd = 400 ml (Bd 140 ml), B/Y = 2, Polymerization Temperature 40° C., Polymerization Time 30 min
Adding Order: Toluene - Bd - 30° C. - TEA - 3 min - Y - 40° C. - B

Example 38

An autoclave with an inner volume of 2 L was provided. The inside thereof was substituted by nitrogen, and a solution of 260 ml of toluene and 140 ml of butadiene was brought therein. The temperature of the solution was elevated up to 30° C., then 2 ml of a solution of diethyl aluminum hydride (DEAH) in toluene (1 mol/L) was added, followed by agitation for 3 minutes at 500 rpm. Next, 2 ml of a solution of tris(2,2,6,6-tetramethyl heptane-3,5-dionate)yttrium in toluene (40 mmol/L) was added, and heated up to 40° C. After agitation for 4 minutes, 0.4 ml of a solution of triphenyl carbenium tetrakis(pentafluoro phenyl)borate in toluene (0.43 mol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 9.

Example 39

Except for the solution of tris(2,2,6,6-tetramethyl heptane-3,5-dionate)yttrium in toluene (40 mmol/L) added by 1 ml, the solution of triphenyl carbenium tetrakis(pentafluoro phenyl)borate in toluene (0.43 mol/L) added by 0.2 ml, and the solution of diethyl aluminum hydride (DEAH) in toluene (1 mol/L) added by 0.5 ml, polymerization was performed similar to Example 38. The polymerization result is shown in Table 9.

Example 40

Except for the solution of diethyl aluminum hydride (DEAH) in toluene (1 mol/L) added by 1 ml, polymerization was performed similar to Example 39. The polymerization result is shown in Table 9.

Example 41

Except for the solution of diethyl aluminum hydride (DEAH) in toluene (1 mol/L) added by 2 ml, polymerization was performed similar to Example 39. The polymerization result is shown in Table 9.

Example 42

Except for the solution of diethyl aluminum hydride (DEAH) in toluene (1 mol/L) added by 3.2 ml, polymerization was performed similar to Example 39. The polymerization result is shown in Table 9.

TABLE 9

| Example No | Y(tmhd)3 mM | DEAH mM | Poly Time min | Yield g/l | Activity gPB/mmol-Y.h | Microstructure (%) | | | [η] |
|---|---|---|---|---|---|---|---|---|---|
| | | | | | | Cis | Trans | Vinyl | |
| 38 | 0.2 | 5.0 | 30 | 125.1 | 1,250 | 98.8 | 0.7 | 0.5 | 2.9 |
| 39 | 0.1 | 1.3 | 30 | 66.7 | 1,330 | 98.5 | 0.8 | 0.7 | 6.8 |
| 40 | 0.1 | 2.5 | 30 | 64.5 | 1,290 | 98.6 | 0.7 | 0.7 | 3.6 |
| 41 | 0.1 | 5.0 | 30 | 122.4 | 2,450 | 98.4 | 1.0 | 0.6 | 2.3 |
| 42 | 0.1 | 8.0 | 30 | 128.2 | 2,560 | 98.3 | 1.1 | 0.6 | 1.8 |

Poly Time: Polymerization Time
Polymerization Conditions: Toluene + Bd = 400 ml (Bd 140 ml), B/Y = 2, Polymerization Temperature 40° C., Polymerization Time 30 min
Adding Order: Toluene - Bd - 30° C. - TEA - 3 min - Y - 40° C. - B

Example 43

An autoclave with an inner volume of 2 L was provided. The inside thereof was substituted by nitrogen, and a solution of 260 ml of toluene and 140 ml of butadiene was brought therein. The temperature of the solution was elevated up to 30° C., then 3 ml of a solution of triethyl aluminum (TEA) in toluene (1 mol/L) was added, followed by agitation for 3 minutes at 500 rpm. Next, ml of a solution of tris(2,2,6,6-tetramethyl heptane-3,5-dionate)yttrium in toluene (20 mmol/L) was added, and heated up to 40° C. After agitation for 4 minutes, 0.1 ml of a solution of triphenyl carbenium tetrakis(pentafluoro phenyl)borate in toluene (0.43 mol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Tables 10 and 11.

Example 44

An autoclave with an inner volume of 2 L, was provided. The inside thereof was substituted by nitrogen, and a solution of 260 ml of toluene and 140 ml of butadiene was brought therein. The temperature of the solution was elevated up to 30° C., then 0.7 ml of a solution of diethyl aluminum hydride (DEAH) in toluene (1 mol/L) was added, followed by agitation for 3 minutes at 500 rpm. Next, 1 ml of a solution of tris(2,2,6,6-tetramethyl heptane-3,5-dionate)yttrium in toluene (20 mmol/L) was added, and heated up to 40° C. After agitation for 4 minutes, 0.1 ml of a solution of triphenyl carbenium tetrakis(pentafluoro phenyl)borate in toluene (0.43 mol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 10.

Example 45

An autoclave with an inner volume of 2 L was provided. The inside thereof was substituted by nitrogen, and a solution of 260 ml of cyclohexane and 140 ml of butadiene was brought therein. The temperature of the solution was elevated up to 30° C., then 2 ml of a solution of triethyl aluminum (TEA) in toluene (1 mol/L) was added, followed by agitation for 3 minutes at 500 rpm. Next, 1 ml of a solution of tris(2,2,6,6-tetramethyl heptane-3,5-dionate)yttrium in toluene (20 mmol/L) was added, and heated up to 40° C. After agitation for 4 minutes, 10 ml of a solution of triphenyl carbenium tetrakis(pentafluoro phenyl)borate in toluene (4 mmol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 10.

Example 46

Except for the solution of triethyl aluminum (TEA) in toluene (1 mol/L) added by 3 ml, polymerization was performed similar to Example 45. The polymerization result is shown in Table 10.

Example 47

An autoclave with an inner volume of 2 L was provided. The inside thereof was substituted by nitrogen, and a solution of 260 ml of cyclohexane and 140 ml of butadiene was brought therein. The temperature of the solution was elevated up to 30° C., then 0.7 ml of a solution of diethyl aluminum hydride (DEAH) in toluene mol/L) was added, followed by agitation for 3 minutes at 500 rpm. Next, 1 ml of a solution of tris(2,2,6,6-tetramethyl heptane-3,5-dionate)yttrium in toluene (20 mmol/L) was added, and heated up to 40° C. After agitation for 4 minutes, 10 ml of a solution of triphenyl carbenium tetrakis(pentafluoro phenyl)borate in toluene (4 mmol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried n vacuum at 70° C. for 6 hours. The polymerization result is shown in Table 10.

Example 48

An autoclave with an inner volume of 2L, was provided. The inside thereof was substituted by nitrogen, and a solution of 260 ml of toluene and 190 ml of butadiene was brought therein. The temperature of the solution was elevated up to 30° C., then 0.06 ml of a solution of carbon disulfide ($CS_2$) in toluene (0.2 mol/L), and 3 ml of a solution of triethyl aluminum (TEA) in toluene (1 mol/L) were added, followed by agitation for 3 minutes at 500 rpm. Next, 1 ml of a solution of tris(2,2,6,6-tetramethyl heptane-3,5-dionate)yttrium in toluene (20 mmol/L) was added, and heated up to 40° C. After agitation for 4 minutes, 0.1 ml of a solution of triphenyl carbenium tetrakis(pentafluoro phenyl)borate in toluene (0.43 mol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 11.

Example 49

Except for the solution of carbon disulfide ($CS_2$) in toluene (0.2 mol/L) added by 0.12 ml, polymerization was performed similar to Example 48. The polymerization result is shown in Table 11.

Example 50

Except for the solution of carbon disulfide ($CS_2$) in toluene (0.2 mol/L) added by 0.24 ml, polymerization was performed similar to Example 48. The polymerization result is shown in Table 11.

TABLE 10

Solvent: Cyclohexane

| Example No | Solvent | Al | | Yield g/l | Activity gPB/mmol-Y.h | Microstructure (%) | | | [η] |
|---|---|---|---|---|---|---|---|---|---|
| | | | mM | | | Cis | Trans | Vinyl | |
| 43 | Toluene | TEA | 7.5 | 83.1 | 3,320 | 94.8 | 4.1 | 1.1 | 2.6 |
| 44 | Toluene | DEAH | 1.8 | 53.2 | 2,130 | 97.5 | 1.5 | 1.0 | 2.7 |
| 45 | Cyclohexane | TEA | 5.0 | 9.5 | 380 | 90.5 | 7.8 | 1.7 | 1.8 |
| 46 | Cyclohexane | TEA | 7.5 | 26.4 | 1,050 | 90.2 | 8.1 | 1.7 | 1.9 |
| 47 | Cyclohexane | DEAH | 1.8 | 15.0 | 600 | 92.7 | 4.3 | 3.0 | 0.7 |

Polymerization Conditions: Solvent + Bd = 400 ml (Bd 140 ml), Y(tmhd)₃ 0.05 mM, B/Y = 2, Polymerization Temperature 40° C., Polymerization Time 30 min
Adding Order: Solvent - Bd - 30° C. - Al - 3 min - Y - 40° C. - B

TABLE 11

| Example No | $CS_2$ mM | Yield g/l | Activity gPB/mmol-Y.h | Microstructure (%) | | | [η] |
|---|---|---|---|---|---|---|---|
| | | | | Cis | Trans | Vinyl | |
| 43 | 0 | 83.1 | 3,320 | 94.8 | 4.1 | 1.1 | 2.6 |
| 48 | 0.03 | 53.7 | 2,150 | 95.9 | 3.2 | 0.9 | 2.8 |
| 49 | 0.06 | 43.1 | 1,720 | 96.9 | 2.3 | 0.8 | 3.3 |
| 50 | 0.12 | 29.2 | 1,170 | 97.0 | 2.1 | 0.9 | 3.3 |

Polymerization Conditions: Toluene + Bd = 400 ml (Bd 140 ml), Y(tmbd)3 0.05 mM, TEA 7.5 mM, B/Y = 2, Polymerization Temperature 40° C., Polymerization Time 30 min
Adding Order: Toluene - Bd - $CS_2$ - 30° C. - Al - 3 min - Y - 40° C. - B Except for the use of a neodecanoate (Nd(Ver)₃) instead of tris(2,2,6,6-tetramethyl heptane-3,5-dionate)yttrium, polymerization in Comparative Examples 3 and 4 were performed similar to Examples 36 and 41. The results are shown in Table 12. As can be seen from Table 12, the activity on polymerization is higher when the tris(2,2,6,6-tetramethyl heptane-3,5-dionate)yttrium is used than when the neodymium neodecanoate is used.

TABLE 12

| | Catalyst | Al | | Al/Y | Yield | Activity gPB/mmol-Y.h | Microstructure (%) | | | [η] | Run No |
|---|---|---|---|---|---|---|---|---|---|---|---|
| | mM | | mM | mol/mol | g/l | | Cis | Trans | Vinyl | | |
| E36 | Y(tmhd)₃ 0.05 | TEA | 5.0 | 100 | 104.4 | 4,170 | 94.7 | 4.3 | 1.0 | 3.3 | 171 |
| E41 | 0.1 | DEAH | 5.0 | 50 | 122.4 | 2,450 | 98.4 | 1.0 | 0.6 | 2.3 | 179 |
| C3 | Nd(Ver)₃ 0.05 | TEA | 5.0 | 100 | 14.5 | 580 | 97.5 | 1.3 | 1.2 | 3.1 | YS-362 |
| C4 | 0.1 | DEAH | 5.0 | 50 | 37.5 | 750 | 97.5 | 1.3 | 1.2 | 1.0 | 363 |

E36: Example 36,
E41: Example 41
C3: Comparative Example 3,
C4: Comparative Example 4
Polymerization Conditions: Toluene + Bd = 400 ml (Bd 140 ml), Borate/Y = 2, Polymerization Temperature 40° C., Polymerization Time 30 min
Adding Order: Toluene - Bd - 30° C. - Al - 3 min - Nd - 40° C. - Borate Next, examples of the rubber composition for tires according to the present invention will be specifically described. A microstructure was determined through the infrared absorption spectrum analysis and an inherent viscosity was measured similarly.

A molecular weight (Mw, Mn) was measured with a GPC method: HLC-8220 (available from Toso Inc.) and calculated by the standard polystyrene conversion.

A Mooney viscosity ($ML_{1+4}$, 100° C.) was measured on the basis of JIS 6300.

Die swell; obtained as an index of extrusion processability of the compounded product, using a processability tester (MPT: available from Monsanto Inc.), by measuring a ratio of a sectional area of the compounded product on extrusion at 100° C. and a shearing speed of 100 $sec^{-1}$ to a die orifice sectional area (where L/D=1.5 min/1.5 mm).

Lambourn abrasion was measured at a slip rate of 20% in accordance with a measuring method stipulated under. JIS-K6264 and indicated with an index based on 100 of Comparative Example 1 (the larger the index, the better).

A flex crack-growth test was performed in accordance with a measuring method stipulated under JIS K6260. A crack length was measured after 50,000 times of flexing at a stroke of 30 mm and indicated with an index based on 100 of Comparative Example 1 (the larger the index, the better).

The quantity of heat radiation/permanent distortion; measured on the basis of a measuring method stipulated under JIS K6265.

Polymerization Example 1

An autoclave with an inner volume of 2 L, was provided. The inside thereof was substituted by nitrogen, and a solution of 260 ml of toluene and 140 ml of butadiene was brought therein. The temperature of the solution was elevated up to 30° C., then 3 ml of a solution of diethyl aluminum hydride (DEAH) in toluene mol/L) was added, followed by agitation for 3 minutes at 500 rpm. Next, 2 ml of a solution of yttrium octylate toluene (0.1 mol/L) was added, and heated up to 40° C. After agitation for 3 minutes, 1 ml of a solution of triphenyl carbenium tetrakis(pentafluoro phenyl)borate in toluene (0.43 mol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 13.

Polymerization Example 2

Except for the solution of diethyl, aluminum hydride (DEAH) in toluene (1 mol/L) added by 4 ml, polymerization was performed similar to Polymerization Example 1. The polymerization result is shown in Table 13.

Polymerization Example 3

Except for the solution of diethyl aluminum hydride (DEAH) in toluene (2 mol/L) added by 3 ml, polymerization was performed similar to Polymerization Example 1. The polymerization result is shown in Table 13.

Polymerization Example 4

Except for the solution of diethyl aluminum hydride (DEAH) in toluene (2 mol/L) added by 5 ml, polymerization was performed similar to Polymerization Example 1. The polymerization result is shown in Table 13.

Polymerization Example 5

Except for the solution of diethyl aluminum hydride (DEAH) in toluene (1 mol/L) added by 1.9 ml, and the solution of tris(2,2,6,6-tetramethyl heptane-3,5-dionate)yttrium in toluene (0.1 mol/L) added by 0.8 ml instead of yttrium octylate, polymerization was performed similar to Polymerization Example 1. The polymerization result is shown in Table 13.

TABLE 13

| Poly Exam No | Y(Oct)3 mM | DEAH mM | Poly Time min | Yield g/l | Activity gPB/mmol-Y.h | Microstructure (%) | | | [η] |
|---|---|---|---|---|---|---|---|---|---|
| | | | | | | Cis | Trans | Vinyl | |
| 1 | 0.5 | 7.5 | 30 | 38.8 | 155 | 99.0 | 0.4 | 0.6 | 4.5 |
| 2 | 0.5 | 10.0 | 30 | 41.0 | 164 | 98.5 | 0.9 | 0.6 | 2.2 |
| 3 | 0.5 | 15.0 | 30 | 60.8 | 243 | 98.6 | 0.7 | 0.7 | 1.3 |
| 4 | 0.5 | 25.0 | 30 | 83.7 | 335 | 98.2 | 1.1 | 0.7 | 0.9 |
| | Y(tBuAA)3 | | | | | | | | |
| 5 | 0.2 | 4.8 | 30 | 53.3 | 533 | 98.4 | 0.9 | 0.7 | 2.5 |

Poly Exam: Polymerization Example
Poly Time: Polymerization Time
Polymerization Conditions: Toluene + Bd = 400 ml (Bd 140 ml), Borate/Y = 2, Polymerization Temperature 40° C.
Adding Order: Toluene - Bd - 30° C. - DEAH - 3 min - Y - 40° C. - Borate Examples 51-53

In accordance with a compounding table in Table 19, primary compounding was implemented with the use of a Plast Mill to mix the BR of Polymerization Example 5, natural rubber, carbon black, process oil, zinc white, a stearic acid, and an anti-oxidant together. Then, secondary compounding was implemented with the use of a roll to add a vulcanization promoter, and sulfur therein to produce a compounded rubber. This compounded rubber was used to measure the Mooney viscosity and the die swell. Further, the compounded rubber was molded in accordance with the aimed physical property and press-vulcanized at 150° C. to produce a vulcanized product, which was then subjected to measurement of the physical property.

The extruded product has excellent dimensional stability and nice abrasion resistance and flex crack-growth endurance as well as greatly improved heat radiation characteristics (the quantity of heat radiation, and the permanent distortion).

Comparative Examples 5, 6

Except for the use of BR150, BR150L (high-cis polybutadiene rubbers available from Ube Industries, Ltd.) instead of the BR of Polymerization Example 5, compounding was performed similar to Examples 51-53.

TABLE 14

| | Example | | | Comparative Example | |
|---|---|---|---|---|---|
| | 51 | 52 | 53 | 5 | 6 |
| Polymerization Example 6 | 50 | 70 | 30 | | |
| BR150 | | | | 50 | |
| BR150L | | | | | 50 |
| NR(RSS#1) | 50 | 50 | 50 | 50 | 50 |
| Compounded Product ML | 85 | 83 | 87 | 78 | 85 |
| Die Swell | 2.16 | 2.12 | 2.18 | 2.31 | 2.20 |
| Lamborn Abrasion | 101 | 103 | 100 | 100 | 102 |
| Flex Crack Growth | 108 | 106 | 115 | 100 | 105 |
| Heat Radiation Test | | | | | |
| Heat Radiation (° C.) | 27 | 28 | 25 | 34 | 32 |
| Permanent Distortion (%) | 8 | 9 | 7 | 13 | 11 |

*Other Compounding Agents
Carbon black 50
Process oil 3
Zinc oxide 3
Mitsubishi Chemical Diablack I
Esso Oil 110

Next, examples of the rubber composition for golf balls according to the present invention will be specifically described. The polymerization conditions and polymerization results are described together on Table 15. The microstructure was determined through the infrared absorption spectrum analysis, and the inherent viscosity ([η]) and the Mooney viscosity ($ML_{1+4}$, 100° C.) of the raw rubber and the compounded product were measured similarly.

Roll processability was determined by visually observing the winding state of the compounded product wound around a 6-inch roll at 50° C.

Hardness was measured in accordance with a measuring method stipulated under JIS-K6253 using a durometer (type D).

Tensile strength was measured in accordance with a measuring method stipulated under JIS-K6251 using a No. 3 dumbbell at a tensile rate of 500 mm/min.

Rebound resilience was measured in accordance with a measuring method stipulated under JIS-K6251 in a tripso-impact resilience test.

Example 54

An autoclave with an inner volume of 21, was provided. The inside thereof was substituted by nitrogen, and a solution of 260 ml of toluene and 140 ml of butadiene was brought therein. The temperature of the solution was elevated up to 30° C., then 3 ml of a solution of diethyl aluminum hydride (DEAH) in toluene (1 mol/L) was added, followed by agitation for 3 minutes at 500 rpm. Next, 2 ml of a solution of yttrium octylate in toluene (0.1 mol/L) was added, and heated up to 40° C. After agitation for 3 minutes, 1 ml of a solution of triphenyl carbenium tetrakis(pentafluoro phenyl)borate in toluene (0.43 mol/L) was added to initiate polymerization. After polymerization at 40° C. for 30 minutes, 5 ml of a solution of ethanol/heptane (1/1) containing an anti-oxidant was added to terminate the polymerization. After the pressure inside the autoclave was released, the polymerization solution was supplied into ethanol to recover polybutadiene. The recovered polybutadiene was dried in vacuum at 70° C. for 6 hours. The polymerization result is shown in Table 15.

Example 55

Except for the solution of diethyl aluminum hydride (DEAH) in toluene (1 mol/L) added by 4 ml, polymerization was performed similar to Example 54. The polymerization result is shown in Table 15.

Example 56

Except for the solution of diethyl aluminum hydride (DEAH) in toluene (2 mol/L) added by 3 ml, polymerization was performed similar to Example 54. The polymerization result is shown in Table 15.

Example 57

Except for the solution of diethyl aluminum hydride (DEAH) in toluene (2 mol/L) added by 5 ml, polymerization was performed similar to Example 54. The polymerization result is shown in Table 15.

TABLE 15

| Poly Exam No | Y(Oct)3 mM | DEAH mM | Poly Time min | Yield g/l | Activity gPB/mmol-Y.h | Microstructure (%) | | | [η] |
|---|---|---|---|---|---|---|---|---|---|
| | | | | | | Cis | Trans | Vinyl | |
| 54 | 0.5 | 7.5 | 30 | 38.8 | 155 | 99.0 | 0.4 | 0.6 | 4.5 |
| 55 | 0.5 | 10.0 | 30 | 41.0 | 164 | 98.5 | 0.9 | 0.6 | 2.2 |
| 56 | 0.5 | 15.0 | 30 | 60.8 | 243 | 98.6 | 0.7 | 0.7 | 1.3 |
| 57 | 0.5 | 25.0 | 30 | 83.7 | 335 | 98.2 | 1.1 | 0.7 | 0.9 |

Poly Exam: Polymerization Example
Poly Time: Polymerization Time
Polymerization Conditions: Toluene + Bd = 400 ml (Bd 140 ml), Borate/Y = 2, Polymerization Temperature 40° C.
Adding Order: Toluene - Bd - 30° C. - DEAH - 3 min - Y - 40° C. - Borate

The invention claimed is:

1. A rubber composition for tires, comprising:
    (a) 10-90% by weight of a high-cis polybutadiene derived from polymerization of 1,3-butadiene in the presence of a catalyst comprising (A) an yttrium compound, (B) an ionic compound including a non-coordinate anion and a cation, and (C) an organometallic compound including an element selected from the groups 2, 12, 13 of the periodic table;
    (b) 90-10% by weight of a diene-based rubber other than the (a) high-cis polybutadiene; and
    (c) 1-100 parts by weight of a rubber reinforcer mixed in 100 parts by weight of a rubber component (a)+(b);
    the high-cis polybutadiene comprising a cis-1,4-polybutadiene having 90% or more of a cis-1,4 structure.

2. The rubber composition for tires according to claim 1, wherein the (A) yttrium compound comprises an yttrium compound having a high volume ligand in the following general formula:

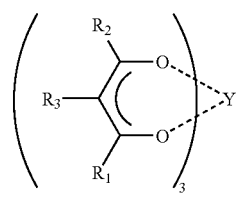

[Chemical Formula 3]

where $R_1$, $R_2$, $R_3$ denote hydrogen or a substituent having 1-12 carbon atoms; O denotes an oxygen atom; and Y denotes an yttrium atom.

3. The rubber composition for tires according to claim 1, wherein the high-cis polybutadiene has a molecular weight adjusted by a compound selected from (1) hydrogen, (2) a hydrogenated metallic compound and (3) a hydrogenated organometallic compound.

4. The rubber composition for tires according to claim 3, wherein the hydrogenated organometallic compound comprises a dialkyl aluminum hydride.

* * * * *

UNITED STATES PATENT AND TRADEMARK OFFICE
CERTIFICATE OF CORRECTION

PATENT NO. : 8,084,565 B2
APPLICATION NO. : 12/685391
DATED : December 27, 2011
INVENTOR(S) : Michinori Suzuki et al.

It is certified that error appears in the above-identified patent and that said Letters Patent is hereby corrected as shown below:

Column 14, Lines 50-51 "3 polymerization" should read -- 3 ml, polymerization --

Column 15, Lines 44-45 "in Table 1." should read -- in Table 4. --

Column 15, Line 56 "volume of 21" should read -- volume os 2L --

Column 17, Line 29 "volume of 21," should read -- volume of 2L --

Column 17, Line 46 "vacuum ate 70 °C" should read -- vacuum at 70 °C --

Column 18, Line 2 "volume of 21," should read -- volume of 2L --

Column 19, Line 23 "(DEAN)" should read -- (DEAH) --

Column 20, Line 5 "190 ml" should read -- 140 ml --

Column 22, Line 59 "Next, ml" should read -- Next, 1 ml --

Column 24, Line 5 "in toluene mol/L)" should read -- in toluene (1 mol/L) --

Column 24, Line 20 "dried n vacuum" should read -- dried in vacuum --

Column 24, Line 29 "190 ml" should read -- 140 ml --

Column 26, Line 3 "(where L/D=1.5 min/1.5 mm)." should read -- (where L/D = 1.5 mm/1.5 mm). --

Column 26, Line 19 "in toluene mol/L)" should read -- in tolune (1 mol/L) --

Column 27, Line 53 "Table 19," should read -- Table 14, --

Column 29, Line 7 "volume of 21," should read -- volume of 2L --

Signed and Sealed this
Fifteenth Day of January, 2013

David J. Kappos
*Director of the United States Patent and Trademark Office*